F. C. HOLMAN.
POWER PLANT.
APPLICATION FILED MAR. 29, 1917.

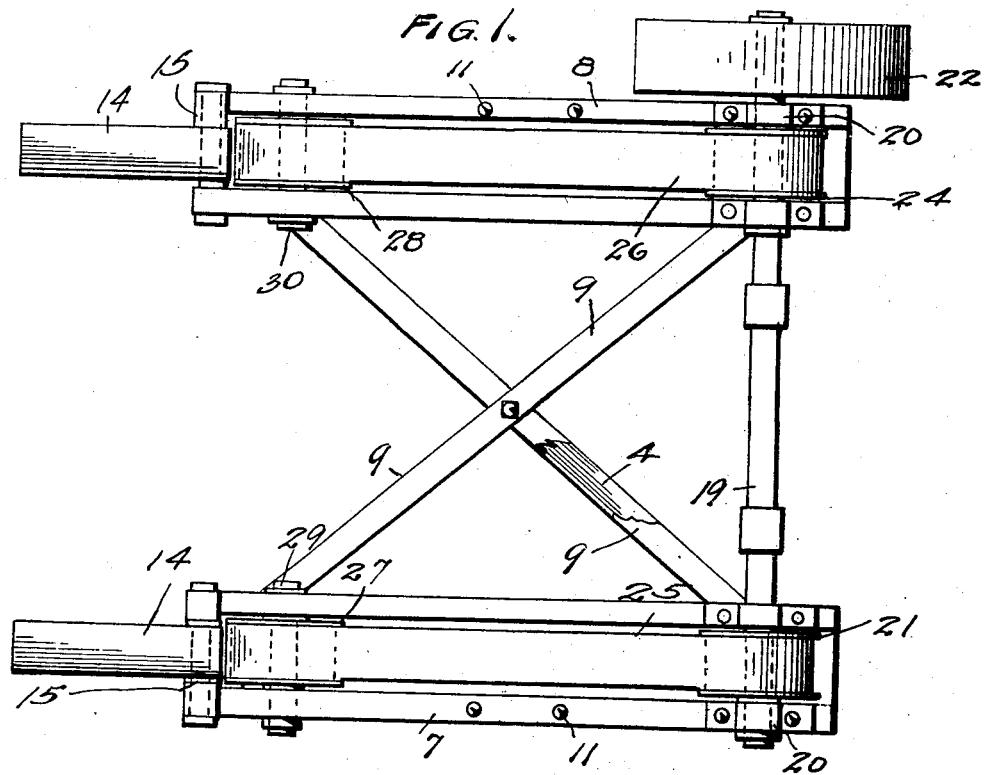
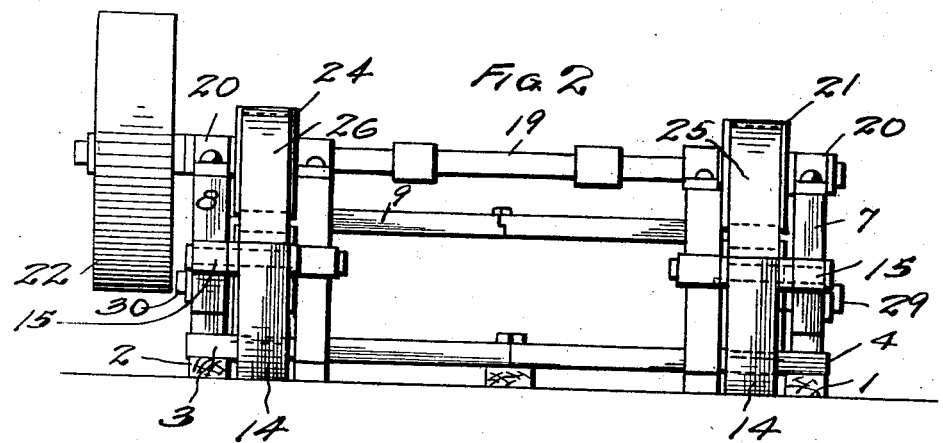

1,266,018.

Patented May 14, 1918.
2 SHEETS—SHEET 2.

F. C. HOLMAN, Inventor

By Herman A. Phillips, Attorney

UNITED STATES PATENT OFFICE.

FRANKLIN C. HOLMAN, OF PUEBLO, COLORADO.

POWER PLANT.

1,266,018.  Specification of Letters Patent.  Patented May 14, 1918.

Application filed March 29, 1917. Serial No. 158,290.

*To all whom it may concern:*

Be it known that I, FRANKLIN C. HOLMAN, a citizen of the United States of America, residing at Pueblo, in the county of Pueblo and State of Colorado, have invented a new and useful Improvement in Power Plants, of which the following is a specification.

The present invention relates to an improved power plant involving the use of an external source of power as an automobile or auto-truck, and the invention is designed for the purpose of providing a power plant adapted for use on farms and in other places whereby power may be developed and utilized for a variety of purposes.

The invention consists essentially in the portable apparatus adapted to be operated by the driving wheels of an automobile to transmit power to the desired point of application, and in certain novel combinations and arrangements of parts as will be hereinafter more fully pointed out and claimed.

In the accompanying drawings I have illustrated one complete example of the physical embodiment of my invention constructed according to the best mode I have so far devised for the practical application of the principles of my invention.

Figure 1 is a top plan view of a structure embodying my invention.

Fig. 2 is a front view of the apparatus.

Figure 3:
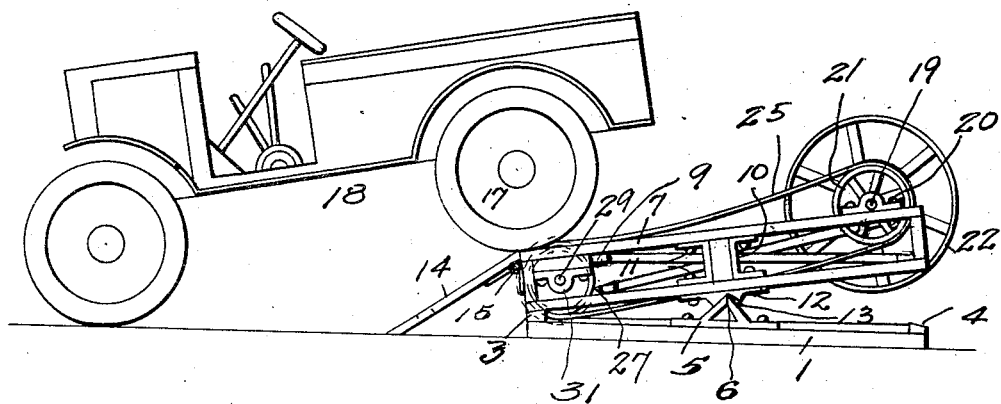
Fig. 3 is a view of reduced scale showing the apparatus when an automobile is being brought into or taken out of operative position with the apparatus.

In the preferred embodiment of my invention as depicted in the drawings, the power plant is portable and of convenient size and shape to accommodate it for use in connection with a typical automobile or auto-truck, and for convenience of illustration I have utilized a medium size auto-truck for exemplifying my invention.

Preferably the apparatus is supported upon a rectangular base comprising the pair of parallel side bars 1 and 2 and the transverse crossed bars 3 and 4, which form a sufficient support and may be transported with facility.

At approximately the longitudinal center of the two side bars I locate a pair of oppositely disposed fulcrum supports in the form of metallic right angles or blocks 5 each formed with a sharpened point or apex 6 and secured to the side bars by means of bolts or other suitable fastening members to hold the fulcrum blocks rigid.

Upon the supporting base and suspended from the two fulcrum blocks is a tiltable or oscillatable frame rectangular in shape and involving in its structure a pair of side trusses as 7 and 8 which are joined at approximately their centers by a transverse cross bar or brace 9. The angle irons 10 are employed to secure the upper and lower bars of the trusses and bolts 11 are used as the fastening means for rigidly attaching the parts together.

At the underside of each of the side trusses is arranged a fulcrum plate 12, bolted to the truss and fashioned with a central notch 13 which fits over the apex of the fulcrum blocks so that the frame may oscillate on the fulcrum blocks, and rest at its front and rear ends on the respective cross bars 3 and 4 of the base.

At the front upper corner of the frame a pair of skids 14 are hinged as at 15, the hinges being attached to the side trusses. The skids perform a double function as illustrated in Figs. 3 and 4, where in the former figure the rear driving wheels 17 of the auto-truck 18 have been driven up on the frame passing over the skid, and in Fig. 4 the skid is in use as a brace to the frame, holding it rigidly in its position and preventing downward movement of the front end of the tiltable frame.

Figure 4:
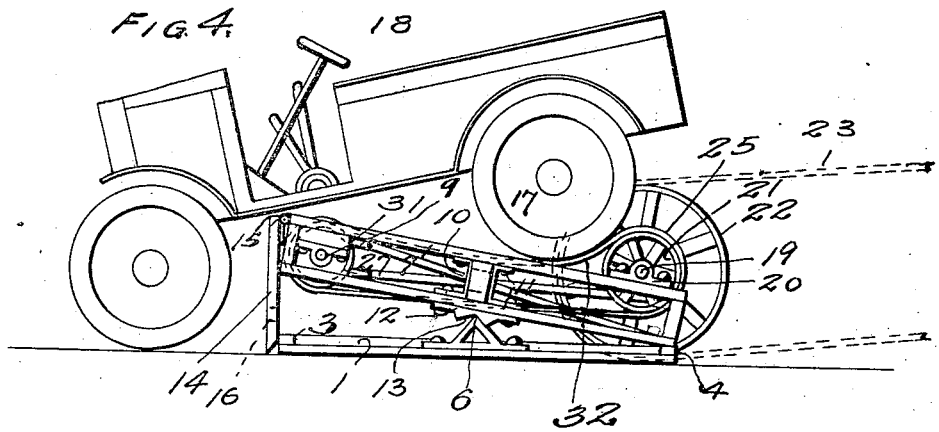
Fig. 4 is a similar view showing the auto-truck in operative position on the apparatus.

Across the rear of the frame a sectional "knockdown" driving shaft 19 extends, and is journaled in bearings 20 bolted to the upper side of the side trusses, and the shaft is provided with a small pulley wheel 21 and the larger drive pulley 22, which may be connected as by belt 23 in dotted lines Fig. 4 to transmit power from the driving shaft to its desired destination. When being transported the trusses and shaft are disjointed so that the separated parts may be moved with facility.

A small pulley 24 is carried by the driving shaft, and this pulley together with pulley 21 is connected, as by belts 25 and 26 to a pair of complementary wheels 27 and 28 on stud shafts 29 and 30, journaled in bearings 31 at the front end of the side trusses of the tiltable frame.

The stud shafts are of sufficient length to accommodate the idle pulleys in order that the space between the side trusses at the front may be clear and unobstructed in order to accommodate the mechanism at the underside of the auto-truck. The construction of the skid brace also allows for unobstructed movement of the auto-truck as seen in Fig. 4.

The two friction belts 25 and 26 are of sufficient width to accommodate the two rear driving wheels of the automobile, and in use, with the apparatus as in Fig. 5, the automobile is backed upon the frame with its rear or driving wheels traveling over the two belts 25 and 26, and it will readily be seen that as soon as the weight of the truck passes over the center of the tiltable frame, the frame will be tilted back to the position of Fig. 4 resting upon the cross brace 4 of the base. The rear wheels of the automobile are now cradled or seated in a depression 32 with the weight of the wheel carried in part by the pulley wheels on the driving shaft, and when the motor of the automobile is in operation the movement of the automobile wheels is transmitted directly to the friction belts and so to the driving shaft and pulley and belt.

The brace-skid 16 holds the frame in rigid position as in Fig. 4, but when it is desired to displace the automobile, the skid is utilized as in Fig. 3 and the automobile is run down off the frame as shown therein.

From the above description taken in connection with my drawings it is evident that I have provided an apparatus which is comparatively inexpensive in production, durable, capable and efficient in operation, and which fulfils the functions of a comparatively perfect device of this character.

What I claim is:

1. The combination with a supporting base, of a tiltable frame thereon, and cross bars on the base for supporting the frame at its ends, a skid-brace hinged at the front of the frame, and a power developing apparatus on the frame including friction belts for coaction with the driving wheels of an automobile.

2. The combination with a supporting base having a pair of pointed fulcrum blocks and transverse cross bars, of a tiltable frame having notched fulcrum plates resting on the blocks, and a hinged skid-brace at the front of the frame, a driving shaft journaled at one end of the frame and a pair of pulleys thereon located at the sides of the frame, a stud shaft and an idle pulley located at the front end of each side of the frame leaving an open space therebetween and a pair of friction belts passing over the pulleys, whereby the driving wheels of an automobile may be supported in a depression of the belts between the driving pulleys and the fulcrum point of the frame.

In testimony whereof I affix my signature.

FRANKLIN C. HOLMAN.

Copies of this patent may be obtained for five cents each, by addressing the "Commissioner of Patents, Washington, D. C."